United States Patent [19]
Sessler et al.

[11] 3,711,941
[45] Jan. 23, 1973

[54] FABRICATION OF ELECTRET TRANSDUCER ELEMENTS USING LOW ENERGY ELECTRON BEAM

[75] Inventors: Gerhard Martin Sessler, Summit; James Edward West, Plainfield, both of N.J.

[73] Assignee: Bell Telephone Laboratories, Incorporated, Murray Hill, N.J.

[22] Filed: Nov. 2, 1970

[21] Appl. No.: 85,883

[52] U.S. Cl. ................................................29/592
[51] Int. Cl. ..............................................H01s 4/00
[58] Field of Search.317/262 A, 262 AE; 307/88 ET; 264/27; 29/592

[56] References Cited

UNITED STATES PATENTS 2,867,733   1/1959   Hunter ...........................29/592 X
3,550,257  12/1970   Brown et al. .....................29/592
3,607,754   9/1971   Asahina et al....................29/592

*Primary Examiner*—Robert L. Spicer, Jr.
*Attorney*—R. J. Guenther and William L. Keefauver

[57] ABSTRACT

Thin film electrets for use in transducers, or the like, may be prepared by irradiating the film with controlled electrons applied by way of a beam. According to this invention, a low energy, focused beam is scanned over the surface of a thin film to produce individual electret areas. Beam energy is maintained low enough to insure that electron penetration is substantially less than the thickness of the film and high enough to insure that the beam is not deflected away from the foil before the charge reaches a sufficiently high level. As a result, a more uniform charge-density product is formed, the charge is bipolar, charge is retained more efficiently than with other processes, and charge time is shortened.

14 Claims, 5 Drawing Figures

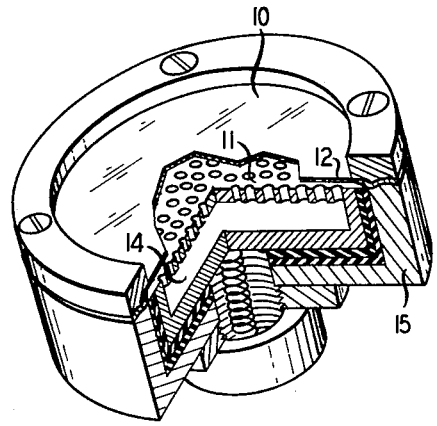
FIG. 1
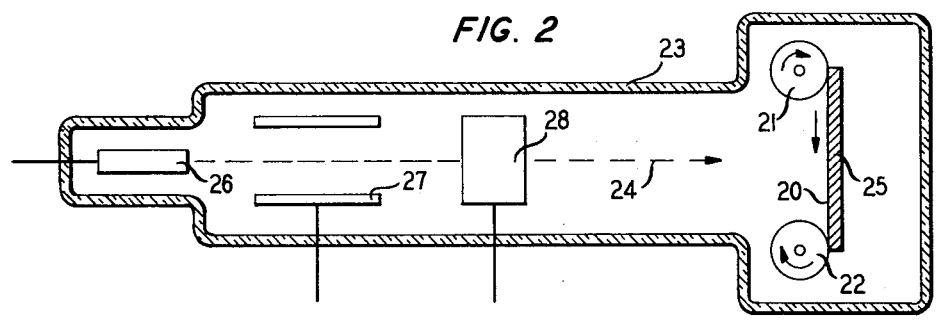
FIG. 2
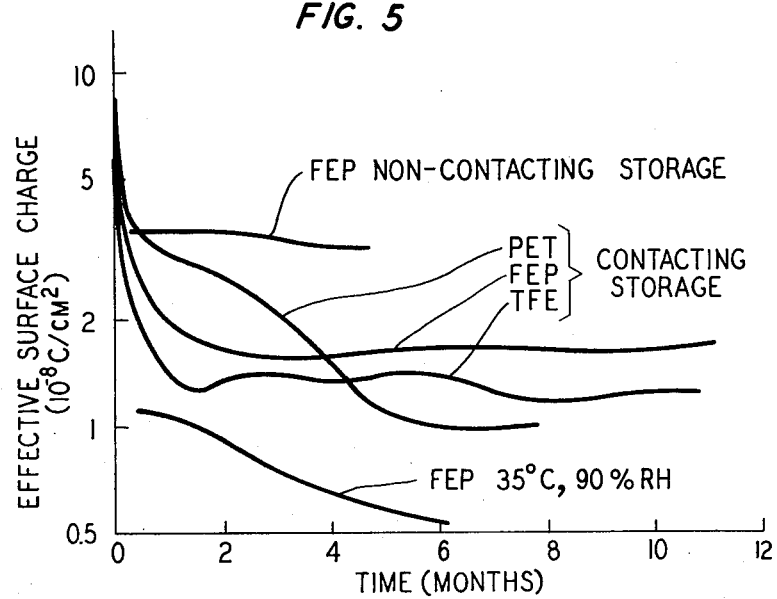
FIG. 5
FIG. 3
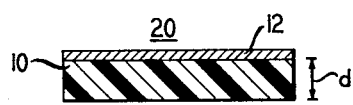

3,711,941

FABRICATION OF ELECTRET TRANSDUCER ELEMENTS USING LOW ENERGY ELECTRON BEAM

This invention has to do with thin film electrets of the sort used as the vibratile diaphragm of electroacoustic transducers, as precipitators, as data storage elements, as stators in electromotors, in electrometers, dosimeters, air filters, and as similar electronic components. More particularly, the invention is concerned with the fabrication of film electrets that have superior charge retention characteristics, both in dry and in humid atmospheres, that are essentially immune to temperature variations, and that exhibit extremely uniform charge densities.

BACKGROUND OF THE INVENTION

Dielectric materials in the form of thin films, for example, of various polymers such as polyesters, one of which is known by the brand name "Mylar," various fluorocarbons, such as the one available commercially with the brand name "Teflon," various polycarbonate resins and the like, are used extensively in a variety of applications. For example, they are used in electroacoustic transducers in the fabrication of capacitors, precipitators, dielectric storage elements, and the like. In a typical electroacoustic transducer, such as an electrostatic microphone or loudspeaker, for example, a thin film of such a material is employed as the vibrating element. To avoid the need for external bias, the moving film is permanently polarized or charged; when so charged, it is known as an "electret" film. Film electret transducers, for example, of the sort described in Sessler-West U.S. Pat. No. 3,118,022, granted on Jan. 14, 1964, have all of the advantages of conventional capacitor units but virtually none of their disadvantages. Unlike the capacitor transducer, an electret unit requires no separate power supply and is mechanically much simpler. It also has a higher capacitance which allows greater freedom in circuit design. Perhaps even more importantly, it has high sensitivity, good frequency response, and low distortion.

Several methods of producing permanent electric charges on dielectric materials have been described in the art. Among these are thermal procedures using the simultaneous application of heat and an electric field, corona and Townsend discharge methods, and electron bombardment techniques using electron beams. Due to charge realignment, charge separation, or charge injection, these methods yield electrets characterized by a heterocharge, a homocharge, or a combination of both.

One of the most satisfactory arrangements for preparing thin film electrets is the capacitance which utilizes an electron beam to bombard the dielectric material. Typically, the dielectric film is held in contact with or at a slight distance away from a dielectric support. Electron energies of about 1 meV are used with a diffused beam intensity on the order of 1 microampere per square centimeter. Thus, such beam irradiation techniques employ a relatively high intensity to produce the desired charge density. The charging of the film is primarily due to reinjection of electrons from the backup material into the film. Since only a fraction of the incident electrons is trapped within the film a somewhat nonuniform charge density often results.

SUMMARY OF THE INVENTION

It is, therefore, an object of this invention to produce thin film electrets with extremely uniform charge densities by use of monoenergetic, low energy, electron beam deposition.

In accordance with the invention a nonpenetrating electron beam, preferably focused and scanned over the surface of a polymer film, is employed to deposit negative charges on the side of the film facing the oncoming electron beam and to cause an injection of positive charges on the other side. Beam energies of from 10 – 40 keV, depending on foil thickness, with a current of approximately 0.01 to 0.1 micro A/cm$^2$ and an exposure time of about 1 second is satisfactory.

Advantageously, these unique parameter values yield a beam condition which induces a previously not observed trapping level which empties at higher temperatures than the known trap levels. This results in superior charge retention characteristics in both dry and humid atmospheres. Moreover, charges are deposited exclusively in the bulk of the film material. This reduces recombination with atmospheric charges and again is responsible for a superior charge retention characteristics of the electret. Uniformity of the surface charge distribution is superior to electret films prepared with known techniques and, by virtue of the scanning arrangement employed in the invention, electret films may be prepared on a continuous production line basis.

BRIEF DESCRIPTION OF THE DRAWINGS

The invention will be fully apprehended from the following detailed description of illustrative embodiments thereof taken in connection with the appended drawings in which:

FIG. 1 illustrates in simplified form the construction of an electrostatic acoustic transducer which illustrates the manner in which a thin film electret is utilized as the vibrating element;

FIG. 2 illustrates schematically a suitable arrangement for preparing thin film electrets in accordance with the invention;

FIG. 3 illustrates the cross section of a typical polymer foil;

FIG. 5 illustrates effective surface charge as a function of time often charging for a number of different thin film electrets, prepared in accordance with the principles of the invention.

DETAILED DESCRIPTION OF THE INVENTION

Figure 4:
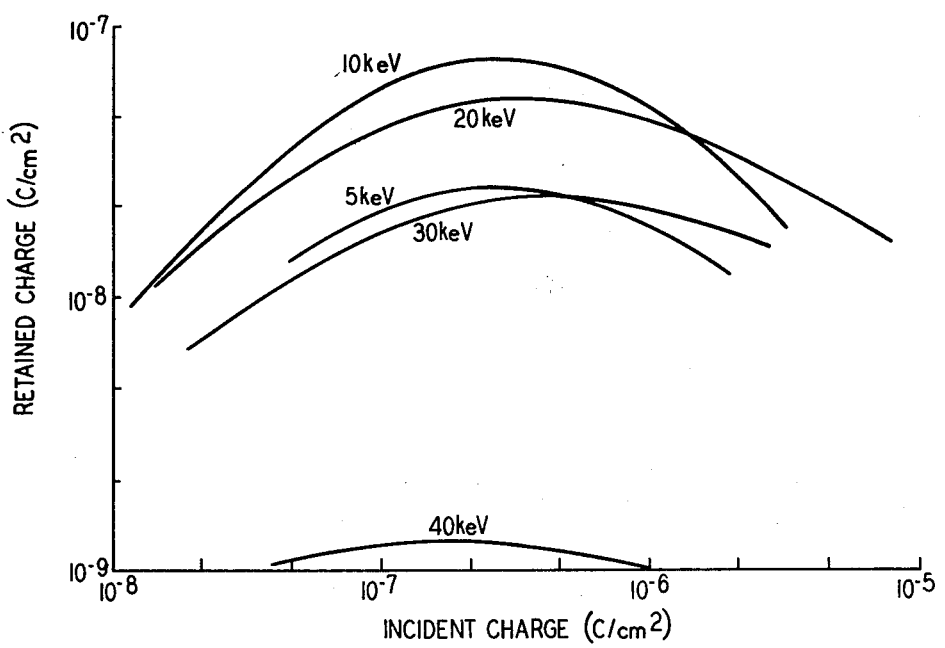
FIG. 4 illustrates retained charge as a function of the incident charge for one-half mil TFE with beam energy as parameter.

One of the most important uses for thin film electrets is in the field of electroacoustic transducers. Since the electret contains a permanent static charge, it is ideally suited for use as the vibrating element of a transducer. No additional bias supply voltage is required when it is used. A typical electroacoustic transducer which employs a thin film electret is shown in FIG. 1. It consists of an electrically charged plastic film 10 stretched over a metal backplate 11. Typically, film 10 is composed of a polymer material, such as, polyethylene terephthalate, (PET), known commercially as Mylar, or polyfluoroethylene-propylene, known commercially as Teflon, (FEP) or Teflon (TFE), with a thickness of about 0.001 inch. An even thinner metal layer 12 is evaporated onto the side of the film not facing the backplate, i.e., the outer surface of film 10. The composite polymer film and evaporated layer is usually referred to as a metallized polymer "foil." The backplate surface is generally arranged so that the foil contacts its surface at discrete points or along discrete lines only. In the areas where no contact is made, shallow air pockets permit the foil to vibrate when sound waves impinge on it. In addition, backplate 11 is perforated and supported above an air cavity 14. This arrangement reduces the stiffness of the air cushion behind the diaphragm and lets the film vibrate with a greater amplitude, thus to increase transducer sensitivity.

Because of the permanent charges on foil 10–12 an electric field is established between the foil and backplate 12. The foil and backplate are connected, by means not shown, to a high impedance input circuit. Motion of the foil, for example, because of an impinging sound wave, thus causes a small ac voltage to be generated in the input circuit. This voltage is proportional to sound pressure.

Reproducibility of the sensitivity of all transducers mentioned above, and immunity to temperature and humidity effects depend in large measure on the uniformity of charge distribution throughout the body of the foils used in these transducers, and the ability of these foils to retain charge despite external influences. In accordance with this invention, thin film electrets which exhibit these properties are produced by charging a polymer film with a monoenergetic electron beam, i.e., a beam in which all electrons have the same energy, of relatively low energy. With controlled, low energy bombardment, it has been found that multiple trapping levels are induced, there is no breakdown of the film, and a uniform bi-polar charge distribution is produced. Moreover, electrons can be trapped at any desired depth in the polymer material merely by controlling the energy of the electron beam.

Thin film electrets with a bi-polar charge density, i.e., positive charges on one side and negative charges on the other, may be produced in accordance with the invention in a number of ways. For example, small area polymer material may be individually charged by supporting the material in a frame placed in the path of an electron beam. In practice, circular samples of about 10 cm diameter were cut and framed between two cardboard rings, leaving an exposed circular film area of about 8 cm in diameter. Irradiation was carried out with a heavy ion accelerator modified for electron extraction by use of a reverse voltage supply. Obviously, any electron beam source capable of producing a beam with energy of from 10 – 40 keV may be used. In the example given above in which a small sample of film was charged, a defocused beam of circular cross-section approximately 10 cm in diameter was used. The framed sample was mounted on a metal disc and supported in the path of the beam within a vacuum chamber maintained at a pressure of approximately $10^{-6}$ Torr. Beam currents of from 0.01 to 0.1 $\mu$A/cm$^2$ were applied for periods of from 1 to 10 seconds. The product of beam current and application time ($I \cdot t$, where $I$ is in amperes and $t$ is in seconds) is equal to the incident charge, and must be maintained within the critical values of $10^{-8}$ and $2 \times 10^{-7}$ A sec/cm$^2$. At lower levels the foil charges insufficiently while at higher levels sparking occurs on the foil. After charging, the foil is removed from the vacuum chamber. For typical films of FEP and TFE, the greatest observed charge densities were $1.0 \times 10^{-7}$ and $2.0 \times 10^{-7}$ C/cm$^2$, respectively. Measurements of charge densities may be made with a disectible capacitor or by means of a noncontacting measurement arrangement. Almost 100 percent of the intercepted charge is retained in the film when the critical values, in accordance with the invention, are employed.

Preferably thin film material is continuously processed, for example, by drawing a sheet of polymer foil material past the point of impact of a scanned electron beam. A suitable arrangement for continuous processing in this fashion is illustrated in FIG. 2. A strip of thin polymer foil 20 is drawn from supply reel 21 and collected on takeup reel 22. Although shown inside vacuum chamber 23, the supply and takeup reels may, of course, be mounted physically outside the chamber and drawn through it by way of vacuum seals of any desired construction. Polymer foil 20 is for example of the same form described with reference to its application in a transducer in FIG. 1. For example, as shown in FIG. 3, it may comprise a thin film of polymer material 10 having a thickness $d$ on the order of 10 – 25 $\mu$m, and a thin evaporated metal layer 12 contacting one of its surfaces. Nonmetallized samples for use in other transducers may also be used.

Foil 20, in its travel from reel 21 to reel 22 is drawn across the path of an impinging electron beam 24 and in front of a grounded metal backup plate 25. Preferably the metallic coating 12 of the foil maintains contact with backup plate 25 throughout the region in which irradiation takes place. On nonmetallized polymer foils, the foil preferably makes contact with a backup plate.

An electron beam originating, for example, in electron beam source 26, is projected toward the film and controlled by vertical diffraction plates 27 and horizontal plates 28 using conventional scanning techniques. The resulting electron beam 24 impinges on foil 20 but is of insufficient intensity to break it down. If the foil is moved in the direction indicated during bombardment, beam 24 is deflected only horizontally, i.e., in a direction perpendicular to the path of the moving foil. If, however, the foil is intermittently stopped in the path of the beam, both horizontal and vertical scanning, in any desired pattern, is used.

Regardless of the exact environment for foil irradiation, more uniform density of retained electrons is produced within a lower intercept charge time. Since there is no polymer breakdown, virtually every electron injected into the film is retained to give a greater lateral uniformity of charge. Moreover, since the film allows virtually no lateral spreading of charge, it is evident that by suitably gating the electron beam, discrete electret areas may be produced on the film. With a programmed gating arrangement, it is evident that a binary pattern of charge may be placed on the film. Also, images of any kind can be similarly produced on the film. Since the retained charge can be accurately controlled by the incident charge, images with a large number of grey tones can be produced. For example, as many as 20 grey tones have been produced on 1 mil FEP foils.

The unique charge implantation achieved in the fabrication of thin film electrets in accordance with the invention can best be explained by considering the range of the electrons of the beam, the path length within the polymer film, and the conductivity of the polymer materials in the absence and in the presence of irradiation. The maximum range, $r_m$, defined as the range for which transmission runs into the background radiation, is about equal to the path length. It has been found that $r_m$ for 35 keV electrons is about equal to 13 $\mu$m for Teflon FEP. Most of the beam electrons lose all of their initial energy and so are absorbed more or less uniformly within depths of $0.2\ r_m$ to $0.6\ r_m$. Conductivity of most polymers increases by many orders of magnitude during irradiation. After radiation has terminated, conductivity returns gradually to its initial value. This suggests the following qualitative explanation for the charging process.

If the maximum range $r_m$ of the electrons is smaller than the foil thickness d, the conductivity during bombardment is large in the part of the foil penetrated by the electrons (front part) and small in the other (rear) part. The conductivity is also small in the surrounding vacuum. Furthermore, the electric field $E(x)$ due to trapped charges in the foil obeys $\int E(x)dx = 0$, where the integration extends from the backplate 25 through foil and vacuum (thickness $>> d$) to the walls of chamber 23. The field in the uncharged rear part of the foil is thus much greater than that in the charged front part or in the surrounding vacuum. Thus, with the field being small in the front part of the foil and in the vacuum and with the conductivity being small in the rear part of the foil and the vacuum, a negative charge builds up in the front part until saturation is reached. Due to the strong field between backplate and charge layer, a positive compensation charge of generally equal magnitude is formed by prebreakdown phenomena in the rear part of the foil. This explains the observation of negative and positive projected surface charges on the front and rear surfaces, respectively, of nonmetallized foils. On a foil metallized on its rear surface, only the negative projected charge on the front surface is measurable. The condition $r_m < d$ is satisfied in 0.5 mil FEP for energies less than 35 keV. This explains the observed strong charging due to the lower-energy beams.

For $r_m > d$, the conductively is large throughout the foil and the field in most of the foil (except for a thin volume close to the front surface) is also relatively large. Thus the charge buildup is impaired by conduction, explaining the considerably smaller saturation charge observed with 40 keV electrons.

FIG. 4 makes it evident that beam energy is a critical parameter in the production of uniform, high charge density electret foils. For 0.5 mil TFE, for example, it has been found that energies of *less* than 5 keV yield both insufficient charge, due to the deflection of the beam, and insufficient penetration. Energies *greater* than 30 keV yield insufficient charge, due to complete penetration of the beam as discussed above. Thus, there is a critical range of energy between 5 and 30 keV for polymers, such as 0.5 mil TFE. This critical parameter is in addition to the critical range for incident charge in terms of the current-time ($I \times t$) product, discussed above.

Superior electret films are thus produced, in accordance with the invention, by controlling beam energy, and the current-time product to achieve operation within the unique, and critical, parameter ranges.

The time dependence of retained charge is plotted in FIG. 5 for different foils subjected to a variety of environmental and storage conditions. For 25.4 $\mu$m FEP stored under laboratory conditions (25°C) and not contacted by measuring and storage devices, no detectable charge decay was obtained (top curve). However, a 15 percent charge decay was observed on 12.7 $\mu$m FEP stored under the same conditions for an equal period of time (results not shown in the figure).

For 12.7 $\mu$m PET, FEP and TFE stored under laboratory conditions on paper sheets and measured with contacting methods, a large initial charge decay was found. Similar results were obtained for storage of the foils on metal. Following an initial decay, charge stabilizes on FEP and TFE and time constants of the charge decay on FEP approach tens of years or more. The charge retained on FEP after a few months is greater than on thermoelectrets or on foils charged with 1 MeV electron beams. This can be attributed to the presence of additional trapping levels that discharge at higher temperatures, and also to the fact that the charges are deposited exclusively in the bulk of the material, thus reducing the probability of recombination with atmospheric charges. On thermoelectrets, the charges are deposited at the surface of the material, while on foils charged with 1 MeV electron beams the charges leak (during and after the bombardment) from the dielectric backplate into surface and bulk traps. The low-energy process of this invention is more efficient and results in less radiation exposure (doses of $10^4$ to $10^5$ rads) and radiation damage than the 1 MeV process.

Also shown in FIG. 5 is the charge decay on FEP at 35°C and 90 percent relative humidity. The charge stability under these conditions is again superior to that of thermoelectrets and electrets charged with 1 MeV electron beams. The measured charge distribution on 25.4 $\mu$m FEP foils charged with a scanned 20 keV beam in accordance with the invention is uniform within ±5 percent over the scanned surface area. Measurements 90 days after charging show that the charge density remains uniform within this area on this particular material. The charge distribution obtained is far more uniform and charge retention is greater than for thermoelectrets.

What is claimed is:

1. The method of fabricating an electret transducer, which comprises the steps of:
   preparing a foil electret by
   1. irradiating a thin foil of polymer material with an electron beam whose energy is selected to be greater than 5 keV but sufficiently small to prevent electrons from penetrating said foil,
   2. maintaining a current density in said material for a time interval selected to establish a current-time product of about $10^{-8}$ to $2 \times 10^{-7}$ A sec/cm$^2$, and 3. continuing said irradiation in a vacuum below $10^{-5}$ Torr for a selected time consistent with said specified current-time product, and supporting said electret in juxtaposition to a conductive backplate.

2. The method of fabricating an electret transducer, which comprises the steps of:

applying a backplate to a thin film electret material which has been charged by bombardment with a focused monoenergetic electron beam operating in the range of 10 to 40 keV for an interval of from one to ten seconds in a vacuum, and electrically interconnecting said backplate and said film electret.

3. The method of fabricating thin film electrets having charge distributed at selected depths in a film of polymer material and with a predetermined charge density, which comprises the steps of, irradiating a thin film of polymer material with an electron beam whose energy is selected to be greater than 5 keV but sufficiently small to prevent electron from penetrating said film, maintaining a current density for a time interval selected to yield a current-time product of about $10^{-8}$ to $2 \times 10^{-7}$ A sec/cm$^2$ and continuing said irradiation in a vacuum below $10^{-5}$ Torr for a selected time consistent with said specified current-time product.

4. The method of fabricating thin film electrets as defined in claim 3, wherein, said electron beam is systematically deflected to scan over selected areas of said thin film of polymer material.

5. The method of fabricating thin film electrets as defined in claim 3, wherein, said electron beam is systematically deflected to scan over selected areas of said thin film of polymer material, and wherein said electron beam is intensity modulated according to a prescribed code, thereby to distribute charge in said film according to a binary pattern.

6. The method of fabricating thin film electrets as defined in claim 3, wherein, said electron beam is systematically deflected to scan over selected areas of said thin film of polymer material, and wherein said electron beam is intensity modulated according to a prescribed schedule, thereby to control retained charge in said film as a defined image characterized by discrete intensity levels.

7. The method of fabricating thin film electrets as defined in claim 3, wherein, said thin film of polymer material is continuously moved past said electron beam at a rate consistent with said specified current-time product, and wherein said electron beam is scanned across the path of said moving film.

8. The method of fabricating thin film electrets as defined in claim 3, wherein, said electron beam is systematically deflected to scan over selected areas of said thin film of polymer material, and wherein said electron beam is intensity modulated according to a prescribed schedule, thereby to control retained charge in said film at discrete intensity levels.

9. The method of fabricating an electret transducer, as defined in claim 1, wherein, said electron beam is systematically deflected to scan over selected areas of said thin film polymer material.

10. The method of fabricating an electret transducer, as defined in claim 1, wherein, said electron beam is systematically deflected to scan over selected areas of said thin film of polymer material, and wherein said electron beam is intensity modulated according to a prescribed code, thereby to distribute charge in said film according to a binary pattern.

11. The method of fabricating an electret transducer, as defined in claim 1, wherein, said electron beam is systematically deflected to scan over selected areas of said thin film of polymer material, and wherein said electron beam is intensity modulated according to a prescribed schedule, thereby to control retained charge in said film as a defined image characterized by discrete intensity levels.

12. The method of fabricating an electret transducer, as defined in claim 1, wherein, said thin film of polymer material is continuously moved past said electron beam at a rate consistent with said specified current-time product, and wherein said electron beam is scanned across the path of said moving film.

13. The method of fabricating an electret transducer, which comprises the steps of:

preparing a thin film electret characterized by a surface charged density in the range of $10^{-8}$ to $2 \times 10^{-7}$ C/cm$^2$, by irridiating a thin film of polymer material backed by a metallic coating with monoenergetic electron beam with an energy range of 10 to 40 keV in a vacuum for not more than 10 seconds with a beam current of approximately 1 microampere, and supporting said electret in juxtaposition to a conductive backplate.

14. The method of fabricating an electret transducer which comprises the steps of:

preparing a thin film electret characterized by a surface charged density in the range of $10^{-8}$ to $2 \times 10^{-7}$ C/cm$^2$, by 1. supporting a thin film of polymer material in juxtaposition to a coextensive conductive electrode,
2. irridiating said film in a vacuum with a 10 to 40 keV monoenergetic electron beam scanned in two dimensions over the surface of said film, and
3. continuing said irridiation for an interval of from 0.1 to 10 seconds with an incident current of approximately 1 microampere, and supporting said electret in juxtaposition to a conductive backplate.

* * * * *